United States Patent
Thönebe

[11] Patent Number: 6,152,622
[45] Date of Patent: Nov. 28, 2000

[54] PROCESS CHART RECORDER WITH DOT PRINTING HEAD

[75] Inventor: Werner Thönebe, Barsinghausen, Germany

[73] Assignee: Hartman & Braun GmbH & Co. KG, Eschborn, Germany

[21] Appl. No.: 09/027,391

[22] Filed: Feb. 20, 1998

[51] Int. Cl.[7] .................................................. B41J 2/315
[52] U.S. Cl. .................. 400/120.16; 346/50; 346/71; 346/141
[58] Field of Search .................................. 346/46, 49, 50, 346/51, 76.1, 78, 79, 94, 113, 136, 141; 400/120.16, 621, 125

[56] References Cited

U.S. PATENT DOCUMENTS

| 4,611,215 | 9/1986 | Onoda | 346/49 |
| 4,853,877 | 8/1989 | Parkhurst et al. | 346/51 |
| 4,856,919 | 8/1989 | Takeuchi et al. | 400/18 |
| 4,896,170 | 1/1990 | Niemeyer | 346/46 |
| 5,296,872 | 3/1994 | Caamano | 400/621 |
| 5,333,005 | 7/1994 | Venthem et al. | 346/141 |
| 5,572,240 | 11/1996 | Schmidt | 346/46 |

*Primary Examiner*—Eugene Eickholt
*Attorney, Agent, or Firm*—Michael M. Rickin

[57] ABSTRACT

A process chart recorder for the on-line recording of process measurement data that has a dot-printing head. In order to develop a chart recorder arrangement having a dot-printing head of the generic type to the extent that the overall printing operation can be effected more easily using mechanically or electromechanically simple means, the printing actuation of the dot-printing head and the actuation of the pen wheel is effected through a common stepping motor. The stepping motor is provided with mechanical means through which the stepping motor is coupled to the pen wheel in a manner causing rotation in one direction and blocking rotation in the opposite direction, with the result that, in one direction of rotation of the stepping motor, only the pen wheel can be actuated and, in the other direction of rotation, the entire dot-printing head can be lowered for printing.

6 Claims, 2 Drawing Sheets

PROCESS CHART RECORDER WITH DOT PRINTING HEAD

1. Field of the Invention

This invention relates to a process chart recorder for the on-line recording of process measurement data and more particularly to such a recorder having a dot-printing head.

2. Description of the Prior Art

Process chart recorders are used wherever to some extent comprehensively controlled processes, for example in the chemical industry, have to be monitored on line. To this end, the process data are picked up in situ by appropriately distributed measured value transmitters and are transmitted to a control point, for example a PLC. Process chart recorders, which record the measurement data as a function of time or as a function of other parameters, are arranged either at the location of the central control point or where it is possible to make a controlled intervention in the process. In this case, a distinction is generally made between two different types of process data chart recorders, namely continuous-line chart recorders and dot recorders.

Continuous-line chart recorders record the process data continuously using appropriately controlled recording pens. In the case of multiple line recorders, a number of process data are recorded simultaneously on one chart recorder. Accordingly, in the case of continuous-line recorders, a number of recording pens are provided.

In the case of the second category of chart recorders, namely in the case of dot recorders, it is also possible for one or more process data to be displayed in terms of their profile with time or as a function of parameters. However, in this case the individual recording lines do not comprise continuously drawn lines but discrete dots, which, although they constitute discrete measurement points in the way they are lined up with one another, constitute a quasi continuous measurement value profile. In this case, the measurement data are fed in via a number of wires, corresponding to the number of the measured values recorded in parallel, and appropriately processed.

In the case in which a number of measured value profiles are to be displayed, with the effect of a multiple-line chart recorder, the printing head for each measured value is offset. For the purpose of distinguishing or identifying different measured value profiles, different colors are also used during the actual writing or printing operation. In the case of using a dot-printing head, same or the printing tip is first moved into the appropriate position, which corresponds to the measured value excursion and the corresponding measured value channel, and is then lowered, briefly or in a pulse-like manner, in order to print the corresponding measurement point.

In the case of conventional dot-printing heads, the two operations:

1. Positioning of the appropriate colored pen,
2. Pulse-like lowering in order to print the printed dot, are executed one after the other using different solenoid means. In the case of dot recorders of the conventional known type, this leads to a considerable expenditure on mechanical parts. As a result, the overall chart recorder arrangement becomes complicated to assemble, on the one hand, and, on the other hand, susceptible to faults.

SUMMARY OF THE INVENTION

The present invention is based on the object of developing a chart recorder arrangement having a dot-printing head of the generic type to the extent that the overall printing operation can be effected more easily using mechanically or electromechanically simple means.

The core of the invention essentially comprises the fact that the positioning of the desired pen, arranged on a drum having a number of colored pens, as well as the actual dot-printing operation, is effected with the aid of a single stepping motor. This takes place as a result of the fact that the stepping motor is connected in a rotationally fixed manner to the colored pen drum or the dot-printing head in such a way that, in one direction of rotation of the stepping motor, a rotation of the dot-printing head is carried out and, in the opposite direction of the stepping motor, the pulse-like lowering of the entire printing head is carried out. In this arrangement, the mechanical transmission means between stepping motor and dot-printing head are rotationally fixed in one direction and blocking in the other direction.

In addition, the stepping motor contains output drives on both sides, loading of an eccentric which acts in the appropriately opposite direction of rotation then taking place at the appropriate other output drive. By loading the eccentric, the printing head is then lowered in a pulse-like manner for the printing operation.

The advantages of the invention reside in the fact that, using a single stepping motor and the coupling, appropriate to the invention, to the two different mechanical means that depend on the direction of rotation, a further stepping motor can be dispensed with. Furthermore, by driving the eccentric, the printing operation is simplified to such an extent that considerably fewer parts are needed. As a result, the overall chart recorder arrangement also becomes less sensitive. As a result of leaving out mechanical and/or electromechanical elements that are otherwise usual, the arrangement is also made more easily accessible.

DESCRIPTION OF THE PREFERRED EMBODIMENT(S)

Figure 1:
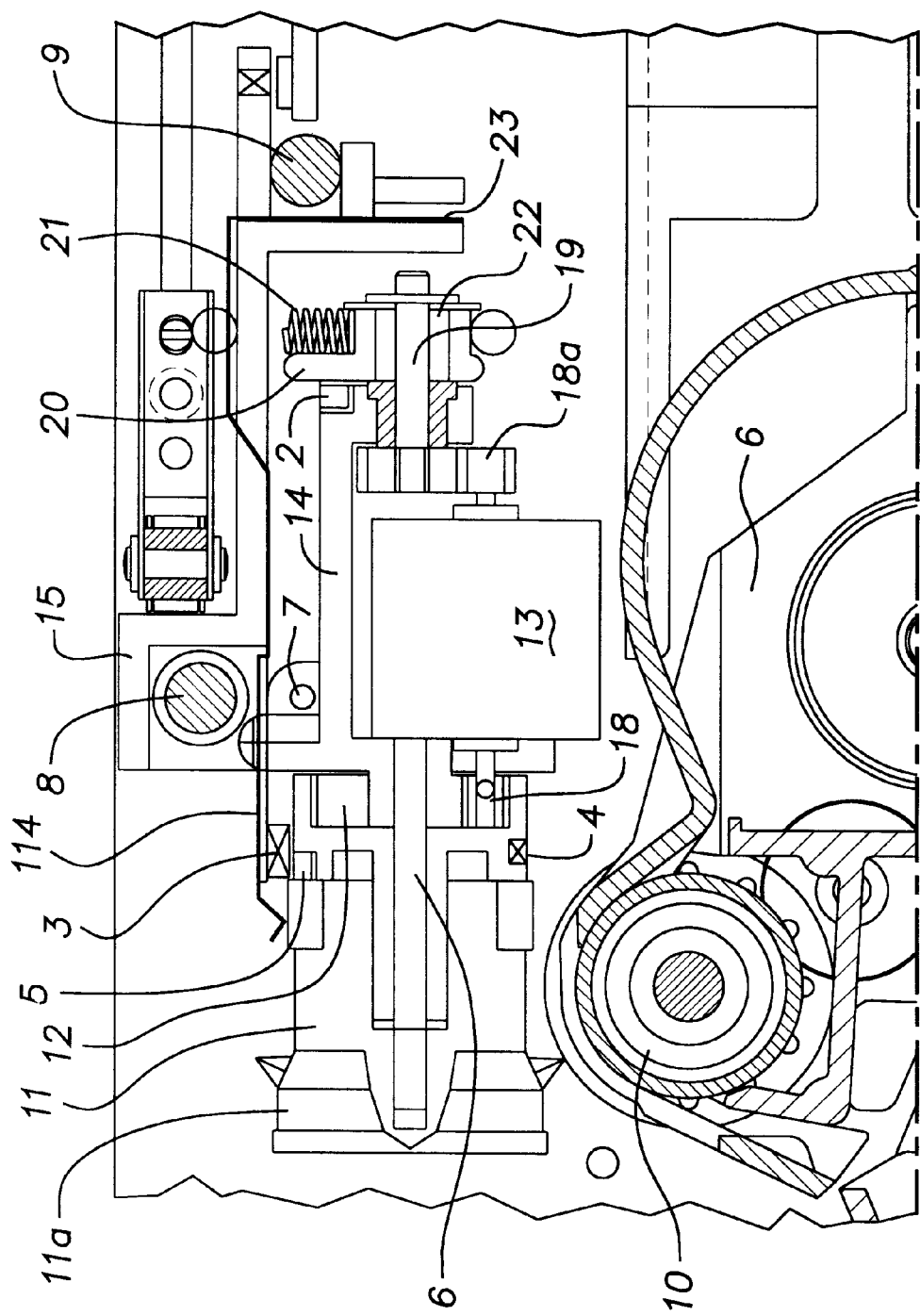
FIG. 1 shows an exemplary embodiment having a stepping motor with two output shaft drives.

Referring now to FIG. 1, there is shown a first exemplary embodiment of the present invention. In FIG. 1, the chart recorder arrangement is essentially restricted to the important elements. Illustrated here is a star-like printing head 11 which can record a number of measured values in various colors as a dotted line on a pin roll 10. In order to be able to cover the recording width of the recorder paper guided on the pin roll 10, a carriage 15 is guided on the axles 8 and 9, parallel to the pin roll. The actual printing device is suspended on this carriage, connected to the hinge 7.

A rocker 14 has its front limb permanently equipped with an axle 6. Rotatably mounted on this axle is a plastic gearwheel 12 which is toothed on the inside. The printing head 11 is likewise pushed onto said axis 6 and retained axially with a latching means (not illustrated). After being pushed on, the printing head 11 is connected, in the manner correspondingly illustrated, to the gearwheel 12 via a driver tab 5 striking it on one side, so that in the event of a clockwise rotation of the gearwheel 12, the printing head follows this movement. This rotational movement is initiated by the stepping motor 13, whose pinion 18 engages in the inner toothing in the gearwheel 12.

A magnet 4 incorporated in the gearwheel 12 indicates the correct color assignment of the printing head to the processor of the recorder arrangement when said magnet 4 passes the Hall sensor 3. Since the printing head has, for example, 6 colored tips distributed around the circumference, the stepping motor has to rotate this printing head further by 60° in each case when the measured point changes. The printing movement required in this case, that is to say the lowering of the printing head 11, is initiated by a reverse movement of the stepping motor 13. The pinion 18a rotates the shaft 19 in a counterclockwise direction, so that the eccentric 20 releases the spacing between carriage and rocker 14, as a result of which the tension spring 21 can pull the rocker upward and, respectively, lower the printing head 11 onto the pin roll 10. This concludes a documented, recorded measurement operation.

As a result of rotating the motor in a clockwise direction, the eccentric 20 is released again and the tension spring 21 aligns the rocker 14 in the horizontal again. Since the stepping motor now has to set the next color by rotating clockwise, but the eccentric 20 has to remain in its position, the eccentric is mounted on a freewheel 22, so that in spite of further clockwise rotation of the motor, the eccentric can remain on its stop 2.

Once the next colored tip has been rotated into the printing position, the printing head is fixed in its position by the leaf spring 114, with the result that the gearwheel 12, with its stop 5 on the right-hand side, rotates counterclockwise for a renewed lowering operation. The necessary control of the stepping motor 13 is carried out via a flat copper ribbon 23, by means of which contact is also made with the Hall sensor 3.

Figure 2:
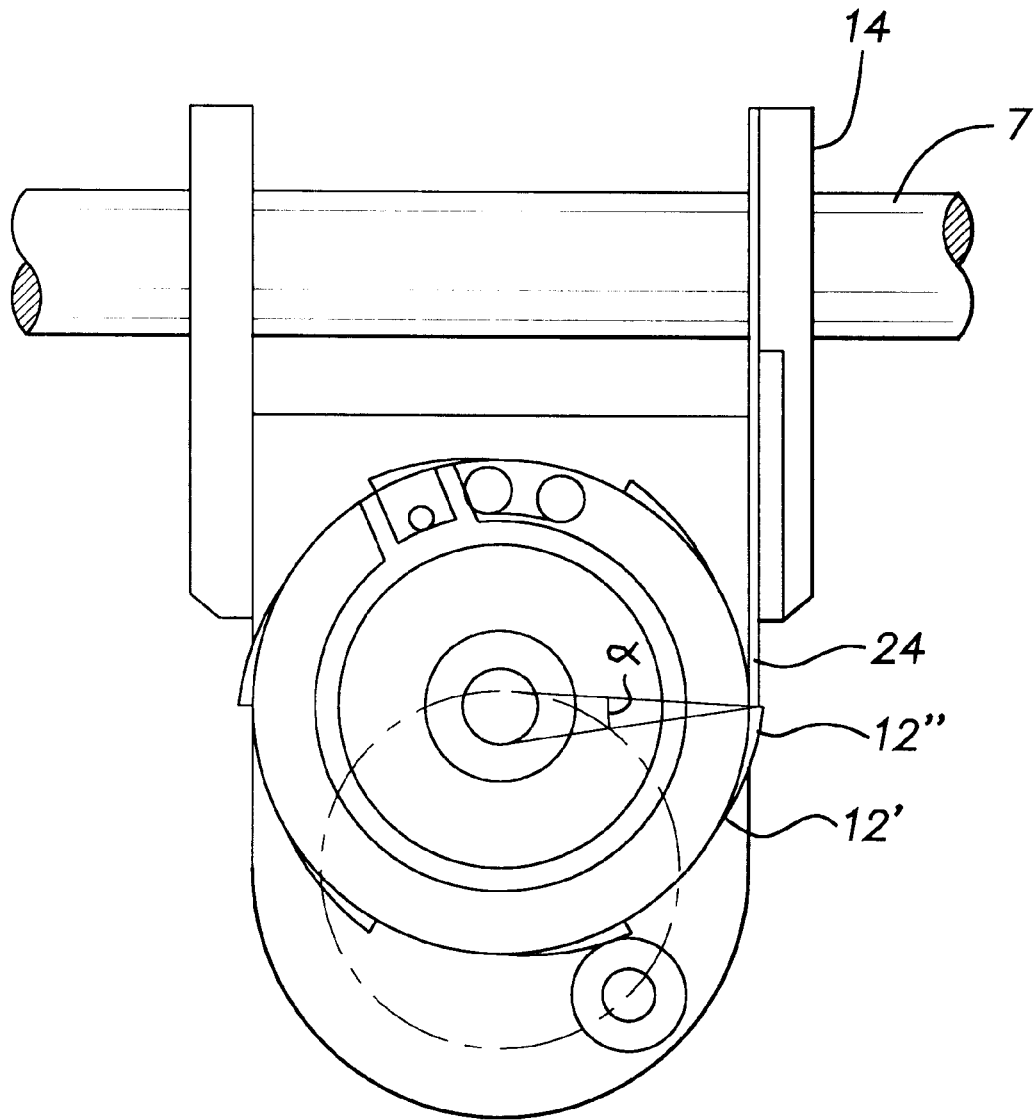
FIG. 2 shows an exemplary embodiment having inhibiting elements that depend on the direction of rotation, but only in a front view.

A further exemplary embodiment of the invention is illustrated in FIG. 2. However, FIG. 2 shows only the essential elements which have to be replaced with respect to an arrangement according to FIG. 1.

In this embodiment of the invention, illustrated in FIG. 2, the components 18a, 19, 20, 21, 22 that are arranged on the second output drive of the stepping motor in FIG. 1, and via which the inhibition as a function of direction of rotation was effected, are dispensed with. Instead, on the outer circumference of the hollow wheel 12' there is arranged a sawtooth contour 12", which is directed counter to the transport direction of rotation of the pen wheel.

For the operation of printing, in which the stepping motor 13 runs backwards, the hollow wheel 12' is blocked or inhibited in its rotational movement by means of a leaf spring 24, since the leaf spring 24 engages behind one tooth of the sawtooth contour 12". This produces, as a result of the torque generated by the stepping motor 13, an escaping movement of the rocker 14 about the axle 7, through the angle α, that is to say downward in this design case. This produces the execution of the printing movement by means that are mechanically very simple.

According to the essence of the invention, this printing movement is produced only in one direction of rotation of the stepping motor. In the opposite direction of rotation, only the actuation of the pen wheel in order to select the desired colored pen is then carried out. Thus, with the aid of a single stepping motor, it is also possible here for both the pen wheel to be actuated in order to select the colored pen and for the printing operation itself to be actuated.

Since the hollow wheel 12' has six teeth, the printing movement can be initiated directly following the setting of each pen during reverse running. If not all the six measuring points are connected, it is then possible for the printing position, identified visually by the sawtooth, to be skipped over as desired.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A process chart recorder for the on-line recording of process measurement data, having a dot-printing head that can be operated by a stepping motor, having a pen wheel that accommodates a number of pens and is arranged on the dot-printing head, and having a recording medium, wherein the printing actuation of the dot-printing head (11) and the actuation of the pen wheel (11a) are effected via a common stepping motor (13), in that the stepping motor is provided with mechanical means via which the stepping motor is coupled to the pen wheel (11a) in a manner causing rotation in one direction and blocking rotation in the opposite direction, with the result that, in one direction of rotation of the stepping motor (13), only the pen wheel (11a) can be actuated and, in the other direction of rotation, the entire dot-printing head (11) can be lowered for printing.

2. The process chart recorder for the on-line recording of process measurement data as claimed in claim 1, wherein the stepping motor (13) has, at the two opposite ends in the axial direction, two output drives (18, 18a).

3. The process chart recorder for the on-line recording of process measurement data as claimed in claim 2, wherein the pulse-like lowering of the printing head (11) in order to print a dot is effected by an eccentric which is arranged in a rotationally fixed manner on the appropriate output drive (18a), the eccentric bringing about lowering in only one direction of rotation.

4. The process chart recorder for the on-line recording of process measurement data as claimed in claim 1, wherein the shaft of the stepping motor (13) is coupled in a rotationally fixed manner to a hollow wheel (12') which is provided on its outer surface with a circumferential sawtooth contour (12").

5. The process chart recorder for the on-line recording of process measurement data as claimed in claim 4, wherein a tongue-like sprung element (24) rests on the sawtooth contour (12") in such a way that in one direction the rotational movement of the stepping motor shaft is permitted and in the opposite direction the rotational movement is inhibited.

6. The process chart recorder for the on-line recording of process measurement data as claimed in claim 5, wherein the stepping motor (13) is arranged on a rocker (14), and the tongue-like element (24) is arranged opposite the motor in a fixed location, in such a way that, in the inhibited direction of rotation, the driving torque of the stepping motor (13) causes the stepping motor, together with the rocker (14), to be lowered, at least briefly, for printing, while being supported on the tongue-like element.

* * * * *